(12) United States Patent
Stava

(10) Patent No.: US 6,870,132 B2
(45) Date of Patent: Mar. 22, 2005

(54) POWER SUPPLY FOR ELECTRIC ARC WELDING

(75) Inventor: Elliott K. Stava, Sagamore Hills, OH (US)

(73) Assignee: Lincoln Global, Inc., Cleveland, OH (US)

( * ) Notice: Subject to any disclaimer, the term of this patent is extended or adjusted under 35 U.S.C. 154(b) by 0 days.

(21) Appl. No.: 10/628,125

(22) Filed: Jul. 28, 2003

(65) Prior Publication Data

US 2004/0021451 A1 Feb. 5, 2004

Related U.S. Application Data

(63) Continuation of application No. 10/059,807, filed on Jan. 31, 2002, now Pat. No. 6,600,134, which is a continuation of application No. 09/575,264, filed on May 22, 2000, now Pat. No. 6,365,874.

(51) Int. Cl.$^7$ ............................................. B23K 9/09
(52) U.S. Cl. ............................. 219/130.51; 219/130.33
(58) Field of Search ...................... 219/130.51, 130.1, 219/130.31, 130.32, 130.33, 137 PS

(56) References Cited

U.S. PATENT DOCUMENTS

| | | | | |
|---|---|---|---|---|
| 3,728,516 A | * | 4/1973 | Daspit | .................... 219/130.33 |
| 4,453,073 A | | 6/1984 | Bredenkamp | |
| 4,742,208 A | * | 5/1988 | Overman | .............. 219/137 PS |
| 4,861,965 A | | 8/1989 | Stava | |
| 4,876,433 A | | 10/1989 | Kashima et al. | |
| 4,947,021 A | | 8/1990 | Stava | |
| 6,051,810 A | | 4/2000 | Stava | |
| 6,365,874 B1 | | 4/2002 | Stava | |
| 6,600,134 B2 | * | 7/2003 | Stava | .................... 219/130.51 |

FOREIGN PATENT DOCUMENTS

JP 64-53773 * 3/1989

* cited by examiner

Primary Examiner—Clifford C. Shaw
(74) Attorney, Agent, or Firm—Fay, Sharpe, Fagan, Minnich & McKee, LLP

(57) ABSTRACT

A power supply connectable to a source of AC line voltage for AC electric arc welding by an AC arc current across a welding gap between an electrode and a workpiece, the power supply comprises a high capacity transformer that converts said line voltage to an AC output voltage, and a rectifier that converts the AC output voltage to a DC voltage between a positive terminal and a common terminal at generally zero volts and a negative terminal and the common terminal. The power supply has a first switch that connects the positive terminal to the common terminal across the gap when a gate signal is applied to the first switch, a second switch for connecting the negative terminal to the common terminal across the gap when a gate signal is applied to the second switch and a pulse width modulator operated for generating pulses at a frequency of at least about 18 kHz. A logic network has a first circuit for directing the pulses to the first switch for a first time, a second circuit for directing the pulses to the second switch for a second time and a controller to alternately operate first and second circuits to create AC arc welding current.

15 Claims, 8 Drawing Sheets

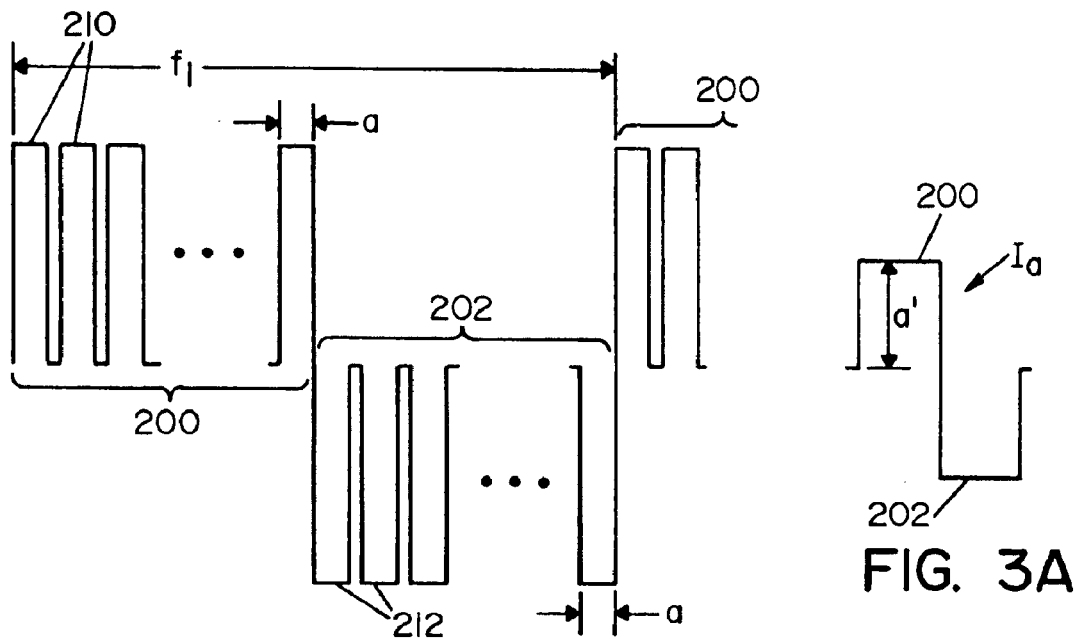
FIG. 3
FIG. 3A
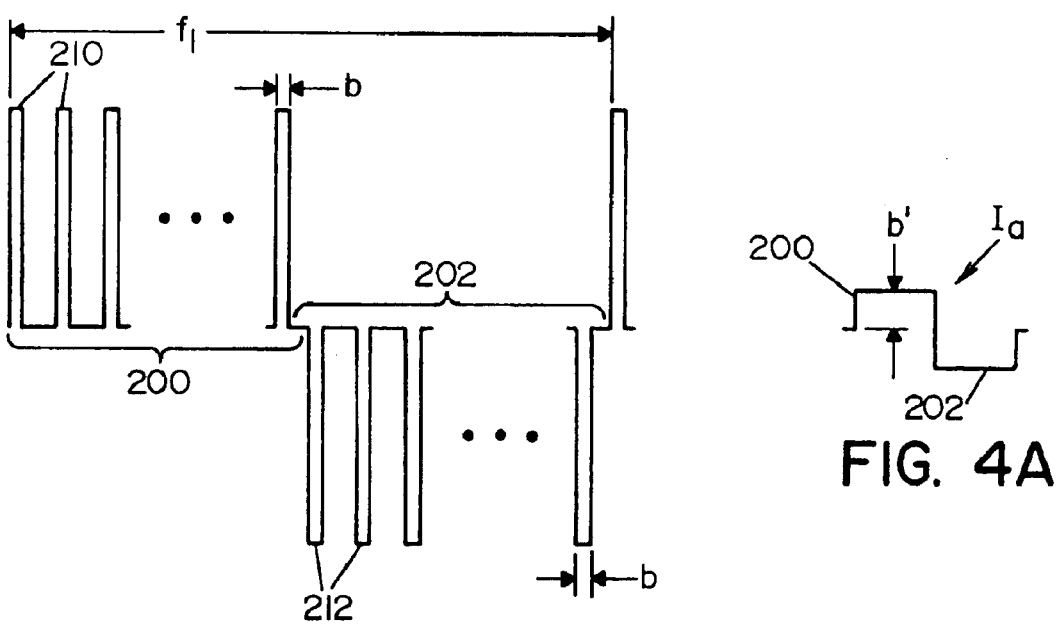
FIG. 4
FIG. 4A

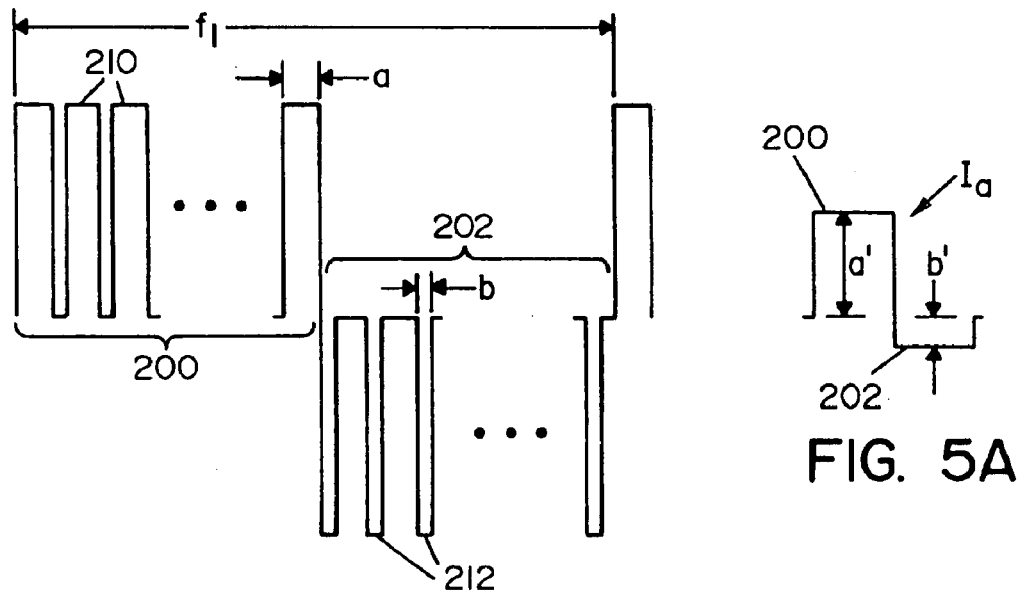
FIG. 5
FIG. 5A
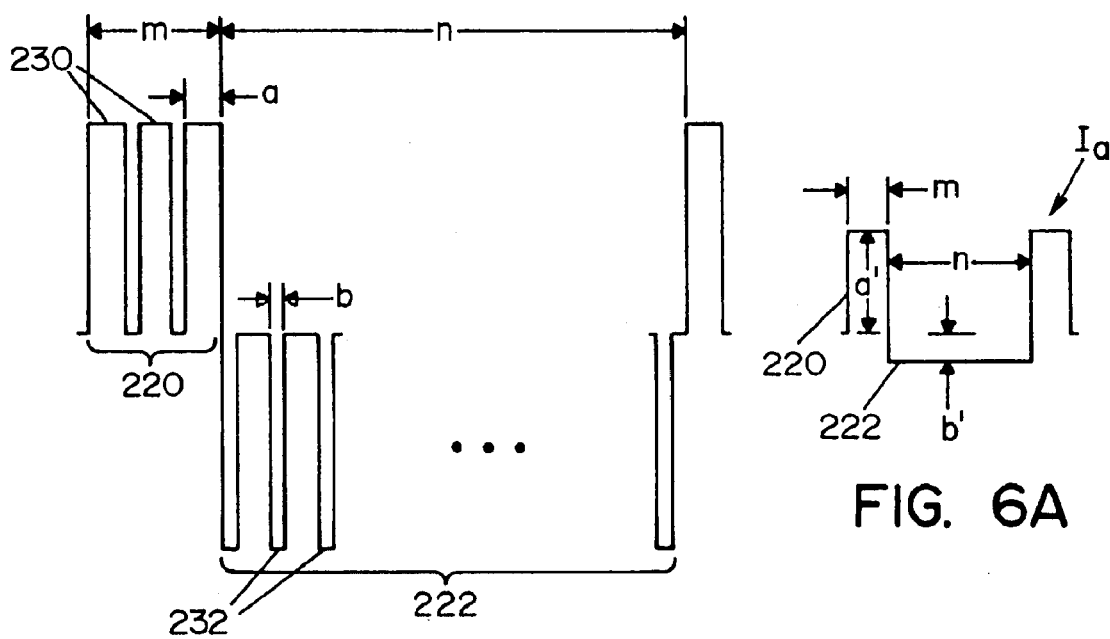
FIG. 6
FIG. 6A

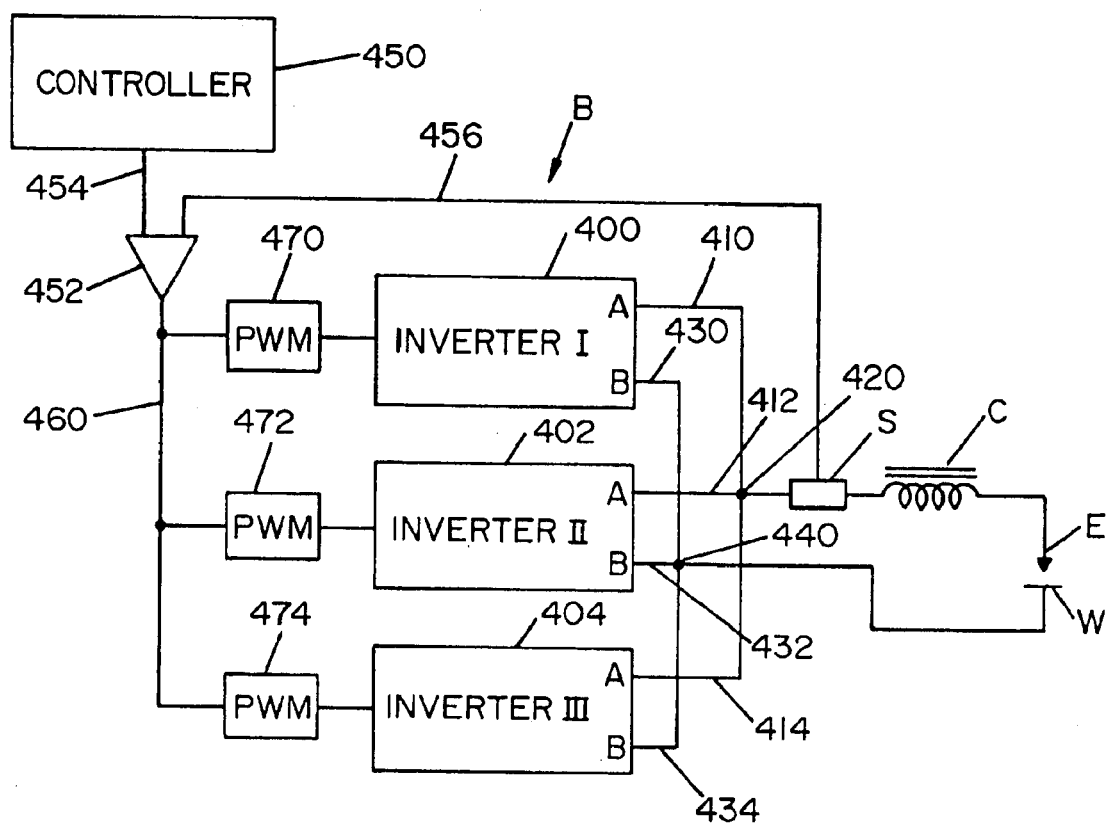
FIG. 10
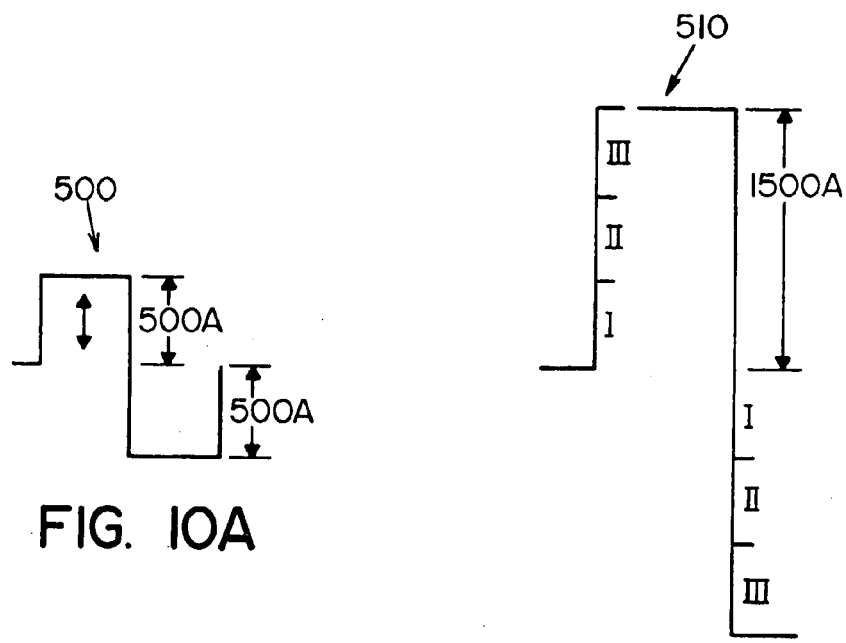
FIG. 10A
FIG. 10B

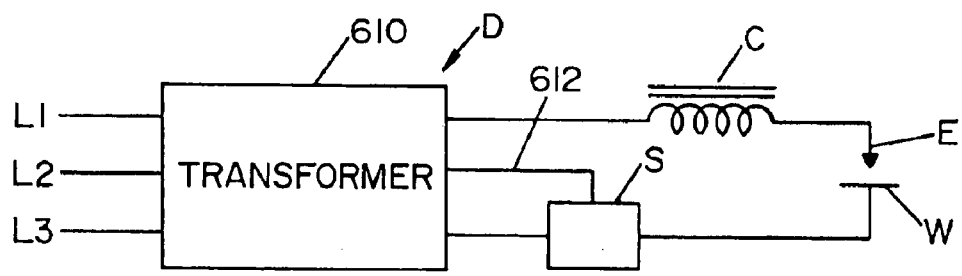
FIG. 11
(PRIOR ART)
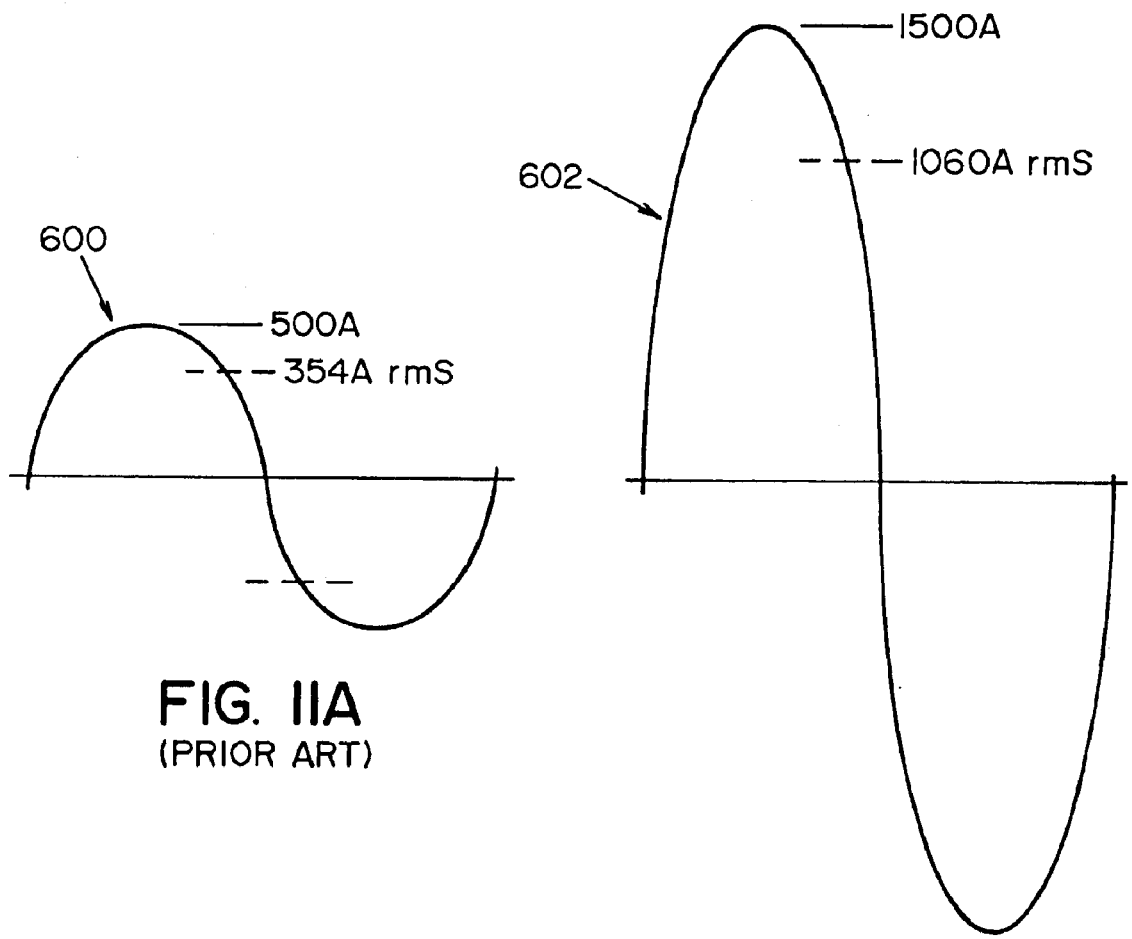
FIG. 11A
(PRIOR ART)
FIG. 11B
(PRIOR ART)

POWER SUPPLY FOR ELECTRIC ARC WELDING

This patent application is a continuation of application Ser. No. 10/059,807, filed on Jan. 31, 2002 now U.S. Pat. No. 6,600,134 which is a continuation of application Ser. No. 09/575,264, filed on May 22, 2000, now U.S. Pat. No. 6,365,874 and incorporated herein by reference.

The present invention relates to the art of electric arc welding and more particularly to a power supply for electric arc welding with an AC arc current.

INCORPORATION BY REFERENCE

The power supply constructed in accordance with the present invention is used to create a positive and negative current pulses having high magnitude generally exceeding 1,000 amperes. The individual pulses are created by a pulse width modulator operating switches in accordance with standard practice. Since the switches must change polarity at high voltages, the power supply is constructed to cause switching from one polarity to the next opposite polarity at reduced current levels. The technique is disclosed in prior application Ser. No. 233,235 filed Jan. 19, 1999 for a different type of current pulse. This prior application is incorporated by reference herein for the purposes of showing a technique for switching a polarity of currents at reduced levels in a high current arc welder. A technique for providing alternating polarity in an inverter power supply for pipe welding is shown in Stava U.S. Pat. No. 6,051,810. This patent is incorporated by reference for its disclosure.

BACKGROUND OF INVENTION

In the manufacture of pipe that has a welded seam, it is common to use multiple AC welding arcs at extremely high current levels, such as over 1,000–2,000 amperes. The less expensive power supply to create such ultra high welding currents is a transformer based welder having a sinusoidal output current. This power supply requires only a large, heavy transformer and related control circuitry. However, to accomplish high welding currents the sinusoidal output has an extremely high peak current compared to the heating current determined by the root mean square of the sinusoidal wave. This relatively inexpensive power supply can create the necessary high current, but results in peak currents that seriously affect the welding operation. To overcome the disadvantages of a sinusoidal type electric arc welder, it is now common practice to use power supplies based upon high frequency switching technology. These switching type power supplies rectify the incoming line voltage to produce a DC link. This DC link is switched through a primary winding of an output transformer as alternating pulses to create an output current constituting the AC arc welding current. Pulse width modulators determine the frequency in the primary winding of the output transformer. Consequently, the pulses at the output transformer are substantially square waves. Thus, the root mean square of the secondary current is essentially the same as the maximum output current for the power supply. In this manner, welding arc does not require high peak currents to obtain the desired root mean square current for heating. Consequently, the inverter type power supply overcomes the disadvantage of the sinusoidal power supply when performing high current electric arc welding of the type needed for seam welding pipes. For this reason, pipe welding has been converted to the inverter technology.

Even though widely used for pipe welding, inverters present a dilemma. Standard inverter type power supplies generally have a maximum output in the range of 500 amperes. To provide an inverter type power supply for high currents in excess of 1,000–2,000 amperes, a special inverter must be designed and engineered. This involves substantial costs and highly trained electrical and welding engineers. But, such high capacity power supply has a relatively low sales volume. Consequently, high current inverters for use in pipe welding are not economically feasible and demand a long lead time. To overcome these disadvantages, The Lincoln Electric Company has developed a power supply using a master inverter, with one or more slave inverters controlled and operated in unison. When the welding operation requires a current in excess of 1500 amperes, three inverters are parallel. The rated output current for the compound inverter is tripled over a single off-the-shelf inverter. Increasing the number of inverters operated in unison to provide a high current type welder is expensive, but accomplishes the desired results.

There is a need for a high current power supply that creates an AC welding current having a root mean square current of over 1,000–2,000 amperes without the requirement of paralleling several standard low current inverters. Such high current power supply for use in electric arc welding of pipes must not have the peak current problem, experienced by a sinusoidal type power supply.

THE INVENTION

The present invention relates to an improved power supply for high current, AC electric arc welding, which power supply can be used in the field for pipe welding and other high current applications. A transformer converts AC line voltage, such as single phase or three phase line voltage, to a low output AC voltage, such as 70–100 volts. The output voltage is rectified and drives two standard down chopper modules, each driven by a common pulse width modulator. In some instances, each module may be driven by a dedicated pulse width modulator. A somewhat standard control board with a microprocessor controller sets the pulse width and, therefore, the magnitudes of the positive and negative current pulses constituting the AC welding current. This relatively inexpensive power supply can replace large inverter units without substantial engineering and lead time. The only disadvantage of the present invention is its high weight, due to the large input transformer; however, such weight is not a serious problem in pipe welding or other high current applications. By using the present invention, the power supply is robust and simple to construct. The power supply is constructed with readily available components.

In accordance with the present invention there is provided a power supply connectable to a source of AC line voltage for AC electric arc welding by an AC arc current across a gap between the electrode and workpiece. The electrode is in the form of an advancing wire that is melted by the arc and deposited on the workpiece. In practice, the workpiece is the gap or joint between two pipe sections. Line voltage is single, or three phase with a voltage between 200 volts and 600 volts AC. The frequency is normally 50 hertz or 60 hertz. The inventive power supply uses a high capacity, large transformer to convert line voltage to an AC output voltage of less than about 100 volts AC. A rectifier converts the AC output voltage to a DC voltage. This DC voltage has a positive potential at a first terminal and a negative potential at a second terminal. The third common terminal is at substantially zero voltage. This zero voltage terminal is preferably a system ground for the rectifier and welding operation. However, the common terminal can be the junction between two generally equal capacitors connected in series across the positive and negative terminals of the rectifier. This common terminal, or junction, coacts with the positive and negative terminals of the rectifier to provide DC voltage, either, positive or negative. A network includes a first switch for connecting the positive terminals to the common terminal and across the gap when a gate signal is applied to the first switch and a second switch for connecting the negative terminal to the common terminal and across the gap when a gate signal is applied to the second switch. A pulse width modulator generates the gate signal in the form of pulses with a pulse frequency of at least about 18 kHz. A first logic gate directs the gate signal to the first switch for a first time period, i.e. a positive current portion, and a second logic gate directs the gate signal to the second switch for a second time, i.e. a negative current portion. A controller alternately operates the logic gates to create an AC arc current alternating between the opposite polarity current portions. The time of the first switch, i.e. the positive portion, can be different than the time of the second switch, i.e. the negative portion. In addition, the duty cycle of the pulse width modulator can be different during the first time, than during the second time. This produces a different amplitude for the alternate positive and negative portions or current pulses creating the AC arc current across the welding gap. The arc melts the advancing wire electrode to deposit molten metal onto the workpiece which, in practice, is a pipe seam.

In accordance with another aspect of the present invention, the controller for the power supply includes an output terminal at which is created a switch enabling signal having a first logic during the first time, i.e. positive or negative output current and a second logic during the second time, i.e. opposite current polarity. There are means for directing the pulses from the pulse width modulator to the first switch during the first time and then to the second switch during the second time. In accordance with still a further object of the present invention, there is provided a bi-directional, but selectable free wheeling circuit in parallel with the welding gap. This circuit is either a parallel arrangement circuit or a series circuit. In either design, the diodes are selectively activated during the first and second time periods. These selectable free wheeling diodes are located on the inboard side of the inductor in the output circuit of the welder. As an alternative, a center tapped inductor is used for the controlled inductive impedance. In this architecture, the free wheeling diode circuits are located on opposite ends of the center tapped inductor or choke.

The primary object of the present invention is the provision of a power supply capable of creating high current AC welding current utilizing relatively inexpensive, low engineered components.

Yet another object of the present invention is the provision of a power supply, as defined above, which power supply has a root mean square heating capacity, without the peak currents associated with sinusoidal power supplies.

Still a further object of the present invention is the provision of a power supply, as defined above, which power supply obtains the advantage of parallel mounted inverters, or large high cost inverters without the expense and complexity or such paralled inverters.

Yet another object of the present invention is the provision of a power supply, as defined above, which power supply provides the simplicity of a down chopper while obtaining an AC welding current.

These and other objects and advantages will become apparent from the following description taken together with the accompanying drawings.

BRIEF DESCRIPTION OF DRAWINGS

FIG. 3 is a pulse graph of the pulses directed to the welding operation for balanced amplitude and equal width of the opposite polarity current portions;

FIG. 3A is a current graph resulting from the pulse graph in FIG. 3;

FIG. 4 is a pulse graph similar to FIG. 3 with a lower amplitude for each of the welding portions;

FIG. 4A is a current graph of the resulting current from the pulse graph shown in FIG. 4;

FIG. 5 is a pulse graph illustrating different amplitudes for the positive and negative current portions of the AC welding current;

FIG. 5A is a current graph of the resulting current created by the pulse graph of FIG. 5;

FIG. 6 is a pulse graph illustrating current pulses of different magnitude and pulse width for the opposite polarity welding current portions;

FIG. 6A is a current graph of the resulting current from the pulse graph shown in FIG. 6;

FIG. 10 is a combined block diagram and wiring diagram of an earlier power supply;

FIG. 10A is a current graph illustrating the AC welding current of one stage in the power supply shown in FIG. 10;

FIG. 10B is a current graph showing the combined output AC welding current obtained in the power supply shown in FIG. 10;

FIG. 11 is a wiring diagram illustrating a very simple power supply for creating high current as used in pipe welding;

FIG. 11A is a sine wave output of the prior art power supply shown in FIG. 11 at a medium output current of 500 amperes;

FIG. 11B is a sine wave output of the prior art power supply shown in FIG. 11 with a high AC welding current with a peak of 1,500 amperes;

PREFERRED EMBODIMENTS

Figure 1:
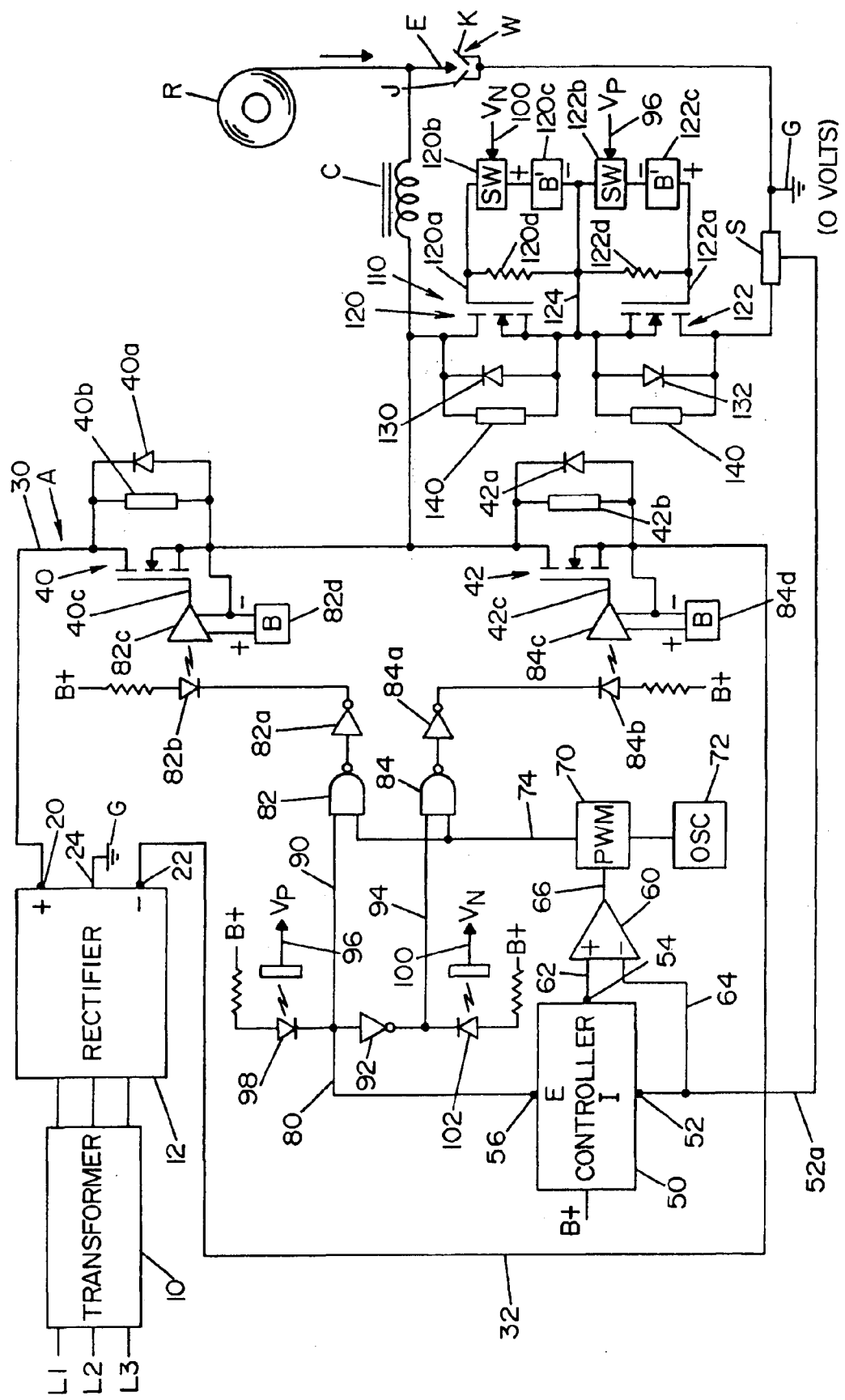
FIG. 1 is a wiring diagram illustrating the preferred embodiment of the present invention.

Referring now to the drawings wherein the showings are for the purpose of illustrating preferred embodiments of the invention only, and not for the purpose of limiting same, FIG. 1 shows a high frequency inverter power supply A for developing an output AC welding current of at least 1,000–2,000 amperes across the welding gap between electrode E and workpiece W which, in practice, is the joint between two adjacent pipe sections J, K. In accordance with standard practice, inductor C having an inductive impedance which smooths out the current flow through the welding operation defined by electrode E and workpiece W. Electrode E is an advancing wire from supply reel R which is melted by the arc created by the AC welding current. Workpiece W, comprising pipe sections J, K, is connected to system ground G. This ground is a zero voltage rail or bus to define the positive and negative current portions. The AC current in the welding operation is detected or sensed through a shunt S to create a current feedback signal that controls the magnitude of the welding current. In the illustrated embodiments, power supply A includes a transformer 10 having an input connected to line voltage shown as a three-phase line voltage. The line voltage has a frequency of 50 Hz or 60 Hz. This low frequency and high capacity makes transformers relatively large. It creates at least about 40–50 kw of energy. The output of the transformer produces an output voltage of less than 100 volts AC. The input line voltage varies between 220–600 volts AC. The output voltage of transformer 10 is directed to rectifier 12 having a positive terminal 20, a negative terminal 22, and a zero voltage terminal 24. Preferably the zero voltage reference is system ground G. Positive terminal 20 is connected to power lead 30, whereas negative terminal 22 is connected to power lead 32. Positive switch 40 in the form of a FET or IGBT includes an anti-parallel diode 40*a* in parallel with a snubber 40*b* and controlled by a given logic on gate 40*c*. Logic on the gate 40*c* renders the positive switch conductive. The lack of the logic or voltage on gate 40*c* turns positive switch 40 off. In a like manner, there is a negative switch 42, having an anti-parallel diode 42*a* in parallel with a snubber 42*b* and controlled by a given logic on gate 42*c*. The logic or voltage on gates 40*c*, 42*c* control the conductivity of power switches 40, 42, respectively. These switches are operated alternately at a frequency desired for the AC welding current. When switch 40 is conductive, a positive current flows through inductor C across the gap and to ground terminal 24 of rectifier 12. Negative switch 42 causes current flow from ground G in the reverse direction through the welding gap and through inductor C. By alternating between operation of switch 40 and switch 42, an AC current is created in the welding gap between the electrode and the workpiece.

In accordance with the invention, the switches 40,42 are enabled for a period of time during which the switch itself is rapidly switched between conduction to non-conduction to direct high frequency pulses from terminals 20 or 22 through the welding operation. Switch 40 is on for the first time and then switch 42 is on for a second time, i.e. the negative portion. By definition the "first time" can be either the positive or negative operation. By switching between these first and second times, the frequency of the AC welding current is controlled. The magnitude of the current is determined by the amount of current allowed to flow during the first time and the second time. To control this operation, there is a somewhat standard controller 50 having an arc current feedback input 52 for receiving a sensed voltage on line 52*a* to determine the actual arc welding current. A current control output 54 is directed to error amplifier 60 having a first input 62 for the current command signal from controller 50, and a second input 64 receiving the sensed actual feedback current signal in line 52*a*. These two inputs to the amplifier produce an error signal in output 66 directed to the voltage control input of pulse width modulator 70 driven by an oscillator 72 operated at at least 18 kHz. The voltage level on line 62 controls the pulse width of the signals on line 66. Controller 50 is programmable to vary the voltage on line 62 to give the desired current or wave form of a given time in the welding process. Indeed, the current flow can be varied during a single positive or negative current portion as shown in Stava U.S. Pat. No. 6,051,810.

Figure 1A:
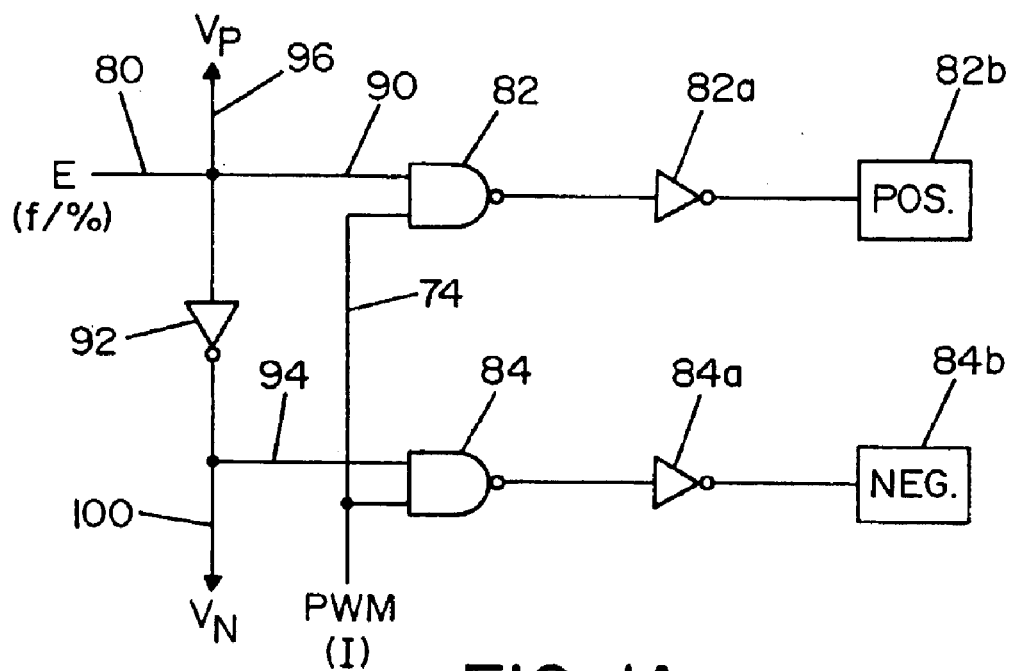
FIG. 1A is a logic diagram showing a portion of the control circuit used in FIG. 1.

A gate signal of pulses of high frequency is created in the output line 74 of the pulse width modulator in accordance with standard welding technology. The pulses on this line have a width determined by the level of voltage on line 66 to determine the duty cycle for the pulses constituting the gate signal in line 74. Line 74 is best shown in the logic diagram of FIG. 1A, wherein a switch enabling signal line 80 has a logic controlled by enable output 56 labeled E on controller 50. The logic on line 80 controls steering NAND gates 82, 84 connected by buffers 82*a*, 84*a* to gate drivers 82*b*, 84*b* shown as optical couplings. The couplings are standard and include receiver 82*c*, 84*c*, isolated power supplies (B) 82*d*, 84*d* to render switches 40, 42, respectively, conductive upon creating of a pulse from gates 82, 84. Line 80 is illustrated as input 90 to gate 82. Inverter 92 provides an opposite logic on line 94, which is directed to steering gate 84. The logic on line 80 shifts in accordance with the desired length of the positive and negative portions in the welding current. A logic one in line 80 enables gate 82. A logic zero in line 80 enables gate 84 through line 94. Consequently, as best shown in FIG. 1A, either the positive switch 40 is enabled or the negative switch 42 is enabled. During switch enablement, the pulses in the gate signal line 74 rapidly operates the activated switch. Consequently, the switches are operated at a frequency in excess of about 18 kHz. The duty cycle of pulse width modulator 70 determines the magnitude of the current during either the positive half-cycle or the negative half-cycle of the AC welding current. The operation of power supply A is quite similar to a down chopper; however, the invention creates both a positive current portion and a negative current portion according to the logic on switch enable line 80. For reasons to be explained later, a positive select signal in line 96 is activated by optical coupling 98 to follow the logic on line 90. This provides a positive selector steering signal. A negative selector steering signal is created in line 100 by optical coupling 102 controlled by the logic on line 94.

Figure 2:
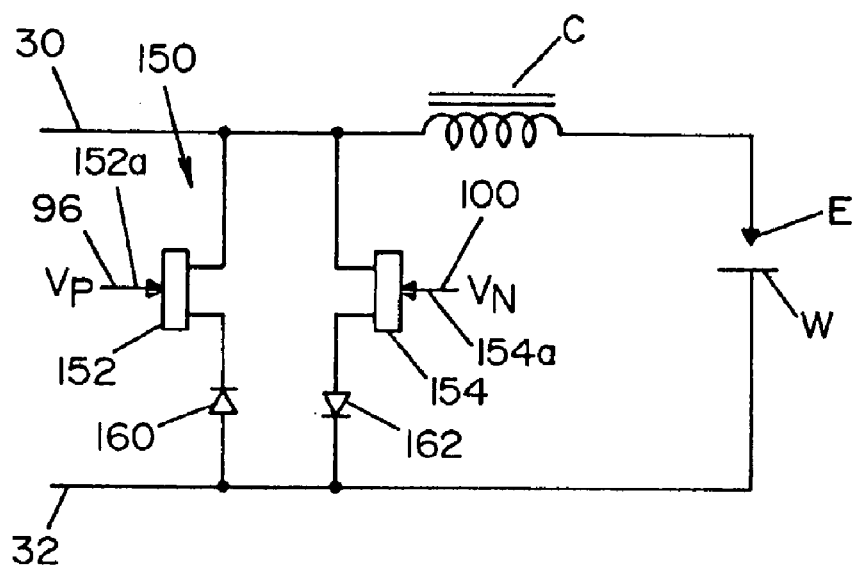
FIG. 2 is a partial wiring diagram of a modification in the bidirectional free wheeling circuit of the preferred embodiment of the present invention.

Positive selector steering line 96 and negative selector steering line 100 control the operation of bidirectional, free wheeling circuit 110 to allow free wheeling of current during the positive and negative first time and second time periods. Circuit 110 includes bypass switches 120, 122 that are preferably a FET or IGBT switch. Switch 120 has a gate 120*a* and a control switch 120*b* operated by the logic in negative steering line 100. In a like manner, switch 122 has a gate 122*a* and a switch 122*b* controlled by the logic on positive steering line 96. In series with switches 120*b*, 122*b* are isolated power supplies (B') 120*c*, 122*c*. Power supplies 82*d*, 84*d*, 120*c* and 122*c* may be the rectified secondaries of a control transformer so they are isolated. Resistors 120*d*, 122*d* keep switches 120, 122 from turning on when there is no signal in the steering line of the particular switch. The anti-parallel diodes 130, 132 of switches 120, 122, respectively, are the free wheeling diodes for the welding operation. These diodes are connected in parallel with snubbers 140 in accordance with standard welding technology. During the positive half-cycle or portion, the logic on line 96 closes switch 122*b*, rendering switch 122 conductive. Thus, free wheeling diode 130 is activated. A signal in line 100 renders switch 120 conductive and activates free wheeling diode 132. Consequently, during the positive portion of the AC welding current, diode 130 is in parallel with the welding operation. During the negative position of the welding operation, diode 132 is in parallel with the welding operation. Thus, the free wheeling diodes are selectable by the logic on steering lines 96, 100. An alternative parallel bidirectional, selectable free wheeling circuit 150 is shown in FIG. 2. Switches 152, 154 including gates 152a, 154a are controlled by the logic on lines 96, 100, respectively. During the positive portion of the AC welding current, the logic on line 96 closes switch 152. This activates free wheeling diode 160. In a like manner, during the negative portion of the welding current, a signal in line 100 closes switch 154 to activate free wheeling diode 162. Either the series switches in FIG. 1 or the parallel switches in FIG. 2 can be selectively energized for providing free wheeling diodes during the positive and negative portions of the AC welding current.

The operation of power supply A is schematically illustrated in FIGS. 3–6, where the amplitude and width of the current pulses and the positive polarity and negative polarity is adjusted by controller 50 by the logic at terminal E. This logic controls the current frequency by the logic on line 80. Terminal 54 controls the level of voltage on line 62 and, thus, the pulse width of the gate pulses on line 74. These signals are programmed into the controller using known techniques and are selected to give the desired current levels and wave forms. In FIG. 3, positive current portion 200 of the welding current shown in FIG. 3A is equal to the negative portion 202 to give a frequency $f_1$. This frequency is determined by the frequency of the logic alternations from terminal E of controller 50. The welder is at maximum current. Thus pulses 210 in the positive direction have a maximum width or duty cycle a. In a like manner, the negative pulses 212 have a maximum duty cycle a. This gives a magnitude a' for the AC welding current $I_a$ as shown in FIG. 3A. Since the current pulses 210, 212 are rectangular, the root mean square is generally equal to the peak value during the welding operation. This accomplishes the advantages of an inverter type power supply as shown in FIG. 10 with the low cost of the sinusoidal arc welder shown in FIG. 11. To reduce the amount of current, controller 50 reduces voltage online 62. In this manner, the duty cycle for the individual pulses 210, 212 is reduced by pulse width modulator 70 so they have width b, as shown in FIG. 4. This low duty cycle or small width gives a low amplitude b' for the AC welding current $I_a$ as shown in FIG. 4A. By having controller 50 change voltage on line 62, a first duty cycle a can be used in the positive portion 200 and the small duty cycle b can be used for the pulses 212 in the negative portion 202 as shown in FIG. 5. As an alternative, controller 50 has a second voltage output to a separate error amplifier driving a second pulse width modulator used for one of the portions 200 or 202. The enable signal at terminal E steers the pulses from both pulse width modulators to the proper switch 40, 42. Thus, an unbalanced AC welding current $I_a$ as shown in FIG. 5A is created. Positive portion 200 has a high magnitude a' and negative portion 202 has a low magnitude b'. The high magnitude or the low magnitude could be in either the positive or the negative portion of the AC current. If two inputs are used to the pulse width modulator for the positive and negative portions of the AC welding current, the logic diagram as shown in FIG. 1A is used to select the proper pulse width modulator input. Line 96 selects the pulse width modulator input during the positive portion of the AC welding current. Line 100 makes the selection during the negative portion. The same concept is used when separate pulse width modulators are used. All of these modifications are well within the skill of the art. By controlling the first time and second time created by the logic at terminal E, positive portion 220 can have a small width m and the negative portion 222 can be provided with a large width n. By combining this operation with a maximum duty cycle a for pulses 230 and a minimum duty cycle b for pulses 232, the AC welding current $I_a$ shown in FIG. 6A is accomplished. Various modifications in the duty cycle and the first time and second time for enabling the switches 40, 42 can be used to tailor the AC welding current to the demands of the welding operation.

Figure 7:
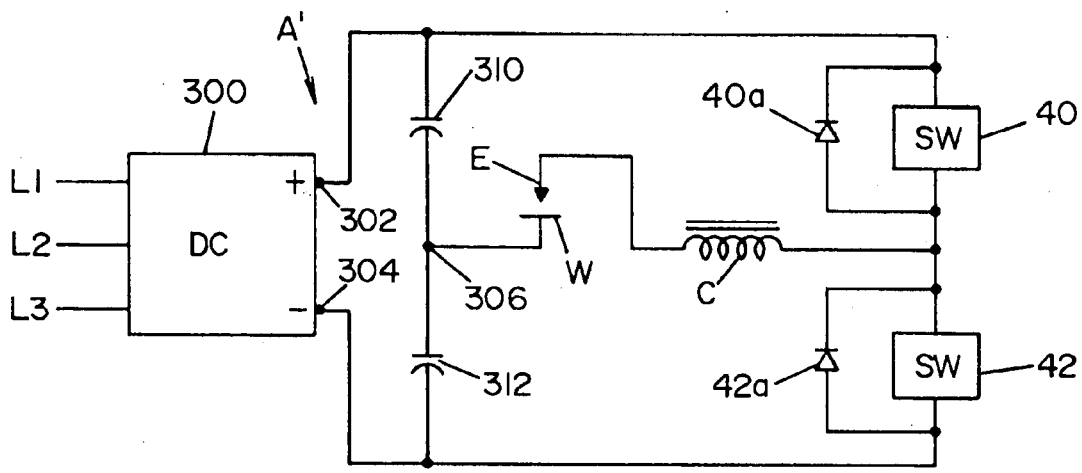
FIGS. 7–9 are alternative embodiments of the invention, as illustrated in FIG. 1.
Figure 8:
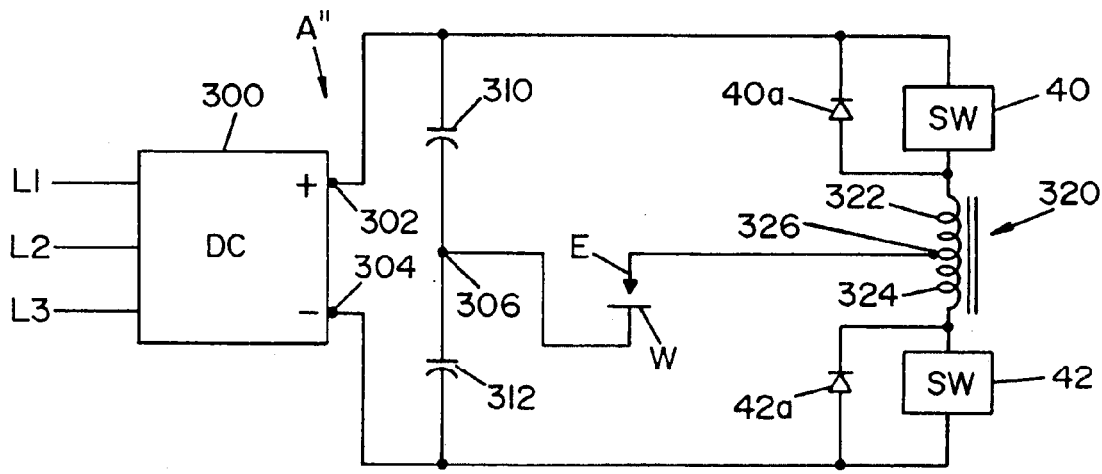
Figure 9:
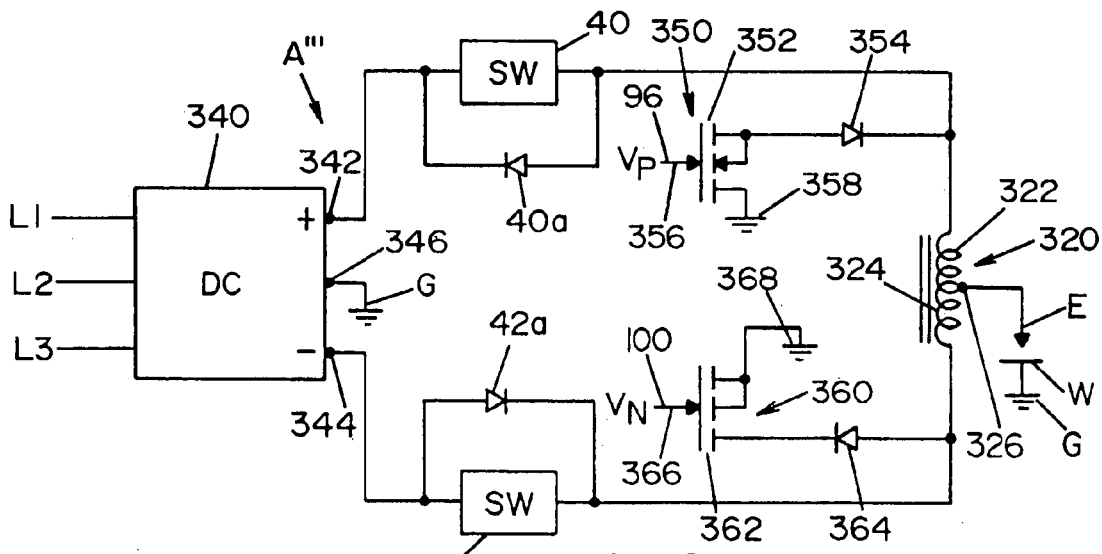

The power supply architecture shown in FIGS. 1 and 2 is used in practice; however, modifications in the architecture are contemplated. Architecture alternatives are shown in FIGS. 7–9 where the same numbers refer to the same components in the three separate power supplies. In FIG. 7, power supply A' includes an input module 300 including a transformer and rectifier to produce a DC voltage across positive terminal 302 and negative terminal 304. Module 300 does not include a grounded terminal, as used in the preferred embodiments. To produce the zero voltage terminal 306, large capacitors 310, 312, which are essentially equal, cause the voltage at terminal 306 to be midway between the positive voltage at terminal 302 and the negative voltage on terminal 304. Thus, junction 306 is a third terminal which is essentially at zero volts and is equivalent to the system ground terminal 24 in FIG. 1. Switches 40, 42 control the positive half-cycle or portion and negative half-cycle or portion of the AC welding current. Inductor C reduces the ripple factor caused by the high frequency pulses during the positive and negative portions of the AC welding current. One of the bidirectional free wheeling circuits shown in FIGS. 1 and 2 is used in power supply A'. Referring now to power supply A" shown in FIG. 8, the architecture is changed to employ a center tapped inductor 320 having a positive section 322, a negative section 324, and a center tap 326. The operation of power supply A" is the same as previously discussed with respect to the preferred embodiment of the invention. However, a bidirectional free wheeling circuit is not shown in this particular power supply. A free wheeling circuit for use in the power supply of FIG. 8 is illustrated in FIG. 9. In this figure, power supply A'" includes an input transformer and rectifier 340 to create a positive voltage at terminal 342 and a negative voltage at terminal 344. In this embodiment, the third terminal 346 is at substantially zero and is the system ground G. Like power supply A", the power supply in FIG. 9 includes a center tapped inductor 320. This architecture illustrates the type of free wheeling circuits used with a center tapped inductor. Free wheeling circuit 350 includes a control switch 352, a free wheeling diode 354, and a gate 356 to control the diode 354 when a given logic appears on positive steering line 96 at gate 356. Switch 352 a FET or IGBT has a drain ground 358. The negative free wheeling circuit 360 includes switch 362 for controlling diode 364 in accordance with the logic on gate 366. Source ground 368, allows the switch to be controlled by the logic on line 100. In a positive half-cycle or current portion, switch 352 is conductive. This inserts free wheeling diode 354 into the circuit. During the negative half-cycle or current portion, switch 362 is conductive inserting free wheeling diode 364 into the circuit. The free wheeling circuits of FIG. 9 can be used in the architecture of FIG. 8. The use of terminal 306 can be used in FIG. 9. Indeed, the components and architectures of the several illustrated embodiments of the present invention are interchangable without departing from the intended spirit and scope of the invention.

High heating current has been obtained by using a plurality of inverters to create a power supply, such as power supply B shown in FIG. 10. This power supply includes three inverters 400, 402, 404, each of which has a small rated capacity of 500 amperes. Output terminal A of each inverter directs the controlled current to positive voltage lines 410, 412, 414 to provide the desired current magnitude at positive terminal 420. In a like manner, negative voltage terminals B are connected to lines 430, 432, 434 to direct the desired negative current to terminal 440. The positive current at terminal 420 and the negative current at terminal 440 are selectively operated in accordance with previous discussed control logic to produce an AC welding current having first the amplitude of terminal 420 and the second amplitude of terminal 440. Controller 450, with an error amplifier 452, having inputs 454, 456 compares the current command in input 454 with the actual current from shunt S appearing in line 456. The desired current control magnitude in line 460 is directed to the input of pulse width modulators 470, 472, 474 that are operated in unison. The desired current is maintained by changing the contribution of each inverter 400, 402, 404 operated as a master and two slaves. Thus, an equal amount of current is provided by all three inverters. If the inverters each have a maximum output of 500 amperes, as shown by current pulse 500 in FIG. 10A, the maximum voltage obtainable at terminals 420, 440 is 1,500 amperes as shown as AC current 510 in FIG. 10B. The earlier unit as shown in FIG. 10 controls the current output of several inverters in unison with a single controller 450. Such an arrangement is superior to designing a special inverter having an output current of 1,500 amperes. To produce 3,000 amperes, power supply B would require the parallel operation of six separate inverters. Combining several inverters, as opposed to specially designing a high capacity inverter, is an advantage over the prior art shown in FIG. 11. In this prior art, the power supply D has a sinusoidal output, such as wave 600 as shown in FIG. 11A. A peak current of 500 amperes is required to give a root mean square current of 354 amperes. This difference is more apparent at higher current demands as shown in FIG. 11B. In creating the output of power supply D to obtain sinusoidal wave 602 with a welding current of 1,000 amperes causes a peak current of over 1,500 amperes. The high current peaks are disadvantageous when pipe welding. High peak currents may not produce consistent welds without expensive monitoring. Power supply D merely includes a transformer 610 which has a current controlled by the difference between the desired current and the actual current represented by the voltage on input line 612. In both power supplies shown in FIGS. 10 and 11, the advantages of the present invention are not obtained.

Figure 12:
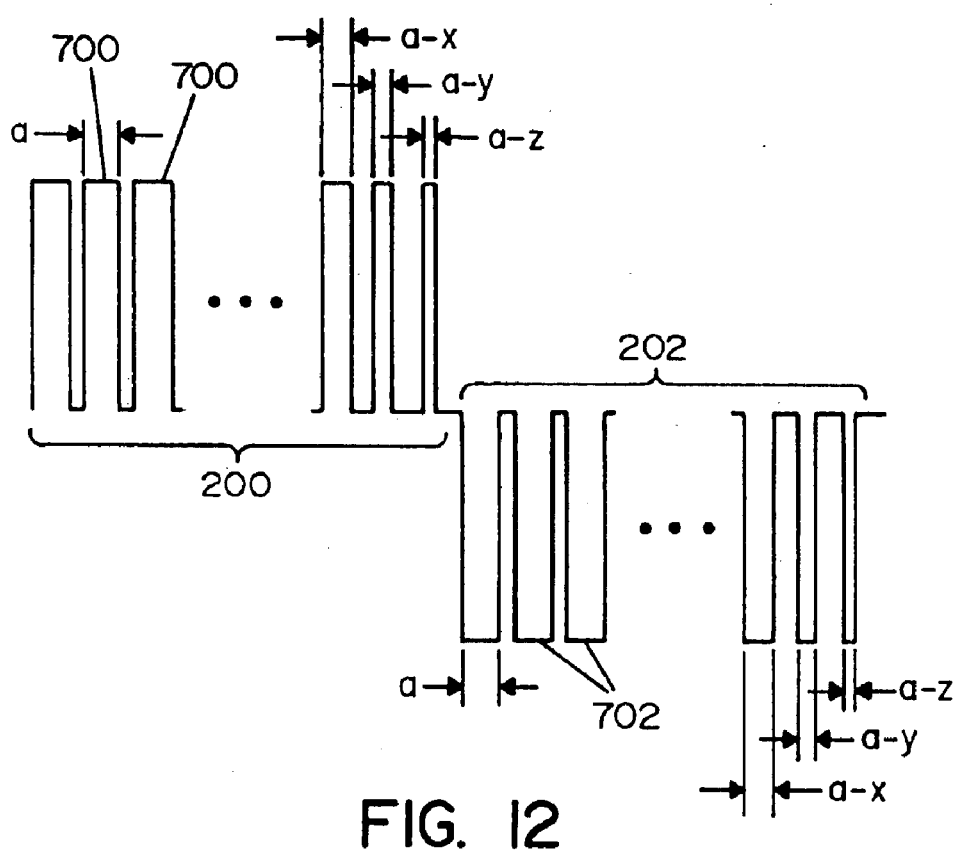
FIG. 12 is a pulse diagram showing a further modification of the invention using graduated current reduction at the end of each current portion of the welding current; and, FIG. 13 is a representation of a single gate pulse illustrating the gradual reduction in width used in the modification of FIG. 12.
Figure 13:
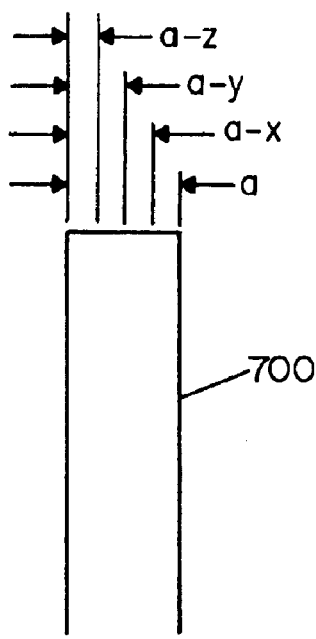

In accordance with another aspect of the inventions, controller 50 is programmed to provide the pulse width modulator with a signal on line 62 that generally reduces the width of the gating pulses at the end of positive portion 200 and negative portion 202. The result of the control feature is shown in FIG. 12. Pulses 700 have a width a to direct the desired high current across the welding gap. At the end of pulse 200, controller 50 causes the pulses to be gradually reduced to a width represented as a-x, a-y, and then a-z. The relationship of these widths is shown in FIG. 13. The same reduction in the width of pulses 702 occurs at the end of negative portion 202. Consequently, when the welding current is to change polarity, the AC welding current is reduced gradually. This reduces the electrical strain of the welding circuit when the direction of current flow changes. This control feature can be used in each of the power supplies A, A', A" and A'".

Having thus defined the invention, the following is claimed:

1. A power supply connectable to an AC line voltage source for AC electric arc welding by an AC arc current across a gap between an electrode and a workpiece, said power supply comprising a high capacity transformer for converting said AC line voltage to an AC output voltage, a rectifier for converting said AC output voltage to a DC voltage between a positive terminal and a common terminal at substantially zero volts and a negative terminal and said common terminal, a first switch for connecting said positive terminal to said common terminal across said gap when a gate signal is applied to said first switch, a second switch for connecting said negative terminal to said common terminal across said gap when a gate signal is applied to said second switch, generating means for generating a gate signal of pulses at a given frequency, a first logic gate for directing said gate signal to said first switch for a first time, a secondlogic gate for directing said gate signal to said second switch for a second time, operating means for alternately operating said logic gates to create said AC arc current, a center tapped inductor for reducing the ripple factor caused by said pulses, said inductor having a positive section, a negative section, and a center tap, and a pair of free wheeling diode circuits located on opposite ends of said center tapped inductor.

2. A power supply as defined in claim 1, wherein said free wheeling diode circuits include a positive branch with a first control switch, a first free wheeling diode and a first gate for controlling said first diode when a given logic appears on a positive steering line at said first gate and a negative branch with a second control switch, a second free wheeling diode and a second gate for controlling said second diode when a given logic appears on a negative steering line at said second gate.

3. A power supply as defined in claim 2, wherein said transformer is rated at least about 30 kW.

4. A power supply as defined in claim 3, wherein said generating means adjusts said pulses to create an arc current of at least 1000 amperes.

5. A power supply as defined in claim 4, wherein said given frequency is at least 18 kHz.

6. A power supply as defined in claim 5, wherein said generating means includes a first input for controlling current amplitude by duty cycle of said pulses during the first time and a second input for controlling current amplitude by duty cycle of said pulse during said second time whereby said amplitudes are different.

7. A power supply as defined in claim 1, wherein said transformer is rated at least about 30 kW.

8. A power supply as defined in claim 1, wherein said generating means adjusts said pulses to create an arc current of at least 1000 amperes.

9. A power supply as defined in claim 1, wherein said given frequency is at least 18 kHz.

10. A power supply as defined in claim 1, wherein said generating means includes a first input for controlling current amplitude by duty cycle of said pulses during the first time and a second input for controlling current amplitude by duty cycle of said pulse during said second time whereby said amplitudes are different.

11. A power supply connectable to an AC line voltage source for AC electric arc welding by an AC arc current across a gap between an electrode and a workpiece, said power supply comprising a high capacity transformer for converting said AC line voltage to an AC output voltage, a rectifier for converting said AC output voltage to a DC voltage between a positive terminal and a common terminal at substantially zero volts and a negative terminal and said common terminal, at least two large capacitors which are essentially equal for causing the voltage at said common terminal to be midway between the positive voltage at said positive terminal and the negative voltage at said negative terminal, a first switch for connecting said positive terminal to said common terminal across said gap when a gate signal is applied to said first switch, a second switch for connecting aid negative terminal to said common terminal across said gap when a gate signal is applied to said second switch, generating means for generating a gate signal of pulses at a given frequency, a first logic gate for directing said gate signal to said first switch for a first time, a second logic gate for directing said gate signal to said second switch for a second time, operating means for alternately operating said logic gates to create said AC arc current and a center tapped inductor for reducing the ripple factor caused by said pulses, said inductor having a positive section, a negative section, and a center tap.

12. A power supply as defined in claim 11, wherein said transformer is rated at least about 30 kW.

13. A power supply as defined in claim 11, wherein said generating means adjusts said pulses to create an arc current of at least 1000 amperes.

14. A power supply as defined in claim 11, wherein said given frequency is at least 18 kHz.

15. A power supply as defined in claim 11, wherein said generating means includes a first input for controlling current amplitude by duty cycle of said pulses during the first time and a second input for controlling current amplitude by duty cycle of said pulse during said second time whereby said amplitudes are different.

* * * * *